United States Patent
Namura

(10) Patent No.: US 7,099,335 B2
(45) Date of Patent: Aug. 29, 2006

(54) COMMUNICATION CONTROL APPARATUS

(75) Inventor: Takashi Namura, Chiba (JP)

(73) Assignee: Oki Electric Industry Co., Ltd., (JP)

(*) Notice: Subject to any disclaimer, the term of this patent is extended or adjusted under 35 U.S.C. 154(b) by 943 days.

(21) Appl. No.: 10/074,042

(22) Filed: Feb. 14, 2002

(65) Prior Publication Data
US 2002/0114335 A1    Aug. 22, 2002

(30) Foreign Application Priority Data
Feb. 22, 2001   (JP)   ............... 2001-045899

(51) Int. Cl.
H04L 12/48    (2006.01)
(52) U.S. Cl. ............... 370/395.63; 370/395.7
(58) Field of Classification Search ............ 370/395.5, 370/395.63, 395.7, 395.71, 395.72, 470, 370/471, 474
See application file for complete search history.

(56) References Cited

U.S. PATENT DOCUMENTS 6,185,212 B1 *   2/2001   Sakamoto et al. ..... 370/395.72
6,944,161 B1 *   9/2005   Sandell ..................... 370/395.1
2001/0024453 A1 *   9/2001   Dekeyser ................... 370/474

FOREIGN PATENT DOCUMENTS

JP    05-110583    4/1993
JP    10-285173    10/1998

* cited by examiner

Primary Examiner—Melvin Marcelo
(74) Attorney, Agent, or Firm—Venable LLP; Michael A. Sartori

(57) ABSTRACT

A communication control apparatus which effectively uses a memory and does not need complicated hardware is realized. Each area of a frame assembly memory 2 is set to the maximum frame length which is handled. When a cell of a new connection is inputted, a memory write control unit (1) allocates the connection to an empty area in the memory (2) and writes the cell therein. When the cell of the same connection as that already allocated to any area is inputted, it is written into the allocated area. If a plurality of cells of one frame have already been written in the area of the same connection, the connection is allocated to another new area and the cell is written therein. A memory read control unit (3) reads out the cells of one frame and outputs them as one completed-frame data.

13 Claims, 17 Drawing Sheets

COMMUNICATION CONTROL APPARATUS

BACKGROUND OF THE INVENTION

1. Field of the Invention

The invention relates to a communication control apparatus which is used mainly in an Asynchronous Transfer Mode: hereinafter, referred to as ATM) communication system and, more particularly, to a communication control apparatus which is suitable for handling an ATM cell of a fixed length belonging to a plurality of VP (Virtual Paths) and VC (Virtual Channels) (hereinafter, both of them are integrated and called VC (Virtual Connection) and which controls a memory for assembling a variable-length information frame that is equal to or larger than one-cell payload length and relates to each VC that is, virtual connection.

2. Related Background Art

In a communication network which handles a frame (conveyance unit) of various information by an ATM cell of a fixed length, one end node of an ATM layer decomposes the frame into a plurality of ATM cells and transmits them to the other end node. The other end node assembles the original frame from the plurality of received ATM cells, thereby transmitting and receiving the information. An end node on the reception side in a communicating apparatus constructing such a pair of end nodes receives various ATM cells, once stores those ATM cells into a memory, assembles them again, and forms the frame.

Hitherto, as such a kind of apparatus, for example, there are a construction of FIG. 2 in JP-A-5-110583 and a construction of FIG. 3 in JP-A10-285173. According to those constructions, a whole area in a memory is previously divided into corresponding areas every connection, for example, when an ATM cell belonging to a connection A is received, cell data is written into the memory area for the connection A, and when an ATM cell belonging to a connection B is received, cell data is written into the memory area for the connection B. In this manner, the data of each connection is accumulated, thereby realizing the assembly of the frame (such a technique is referred to as a prior art 1).

There is another method whereby a whole area in the memory is not divided into areas every connection but received cells are sequentially written into the memory in order, and annexed information of the cell data (that is, information showing to which connection the cell data belongs, or the like) is separately managed (such a technique is referred to as a prior art 2).

However, in the case where the frame assembly memory is controlled by the above prior arts, there are the following problems.

With respect to the prior art 1, when the cells regarding the same logical communication path, that is, the same connection are concentratedly received in a certain short time, in spite of the fact that an area as a whole memory is almost empty, only the area for such a connection is filled with the data and an overflow occurs. There is a problem from a viewpoint of the effective use of the memory.

With respect to the prior art 1, since it is not practical to also allow the memory areas to correspond to each of $2^{28}$ (VPI (Virtual Path Identification)+VCI (Virtual Channel Identification)=28 bits) connections to which the ATM cells can inherently correspond, there is a problem such that it is necessary to apply some restriction with respect to connection numbers which can be handled on the system (a range of the connection numbers which can be used is limited, the connection number is converted into a local ID which is effective only in an apparatus, or the like).

With respect to the prior art 2, although the memory can be also effectively used at the time of the concentration on the same connection, since the frame assembly information needs to be separately managed, there is a problem such that hardware becomes complicated.

OBJECTS AND SUMMARY OF THE INVENTION

It is, therefore, an object of the invention to provide a useful communication control apparatus which can effectively use a memory and which needs no complicated hardware.

According to the first aspect of the invention, there is provided a communication control apparatus for collecting cells belonging to a same connection among a plurality of cells which are inputted, assembling a frame every connection, and outputting each frame as frame data, comprising:

a frame assembly memory having a plurality of areas which were set so as to correspond to a maximum one of a plurality of frame lengths which are handled;

a memory write control unit constructed in a manner such that when a cell of a new connection is inputted, the new connection is allocated to the empty area in the frame assembly memory to which the connection is not allocated yet and the cell is written therein, and on the other hand, when the cell of the same connection as the connection which has already been allocated to any of the areas is inputted, such a cell is written into the area to which the connection has already been allocated, and if the cells of one frame have already been written in such an area, the connection is allocated to another new area, and the input cell is written therein; and a memory read control unit which reads out the collected cells of one frame from the frame assembly memory and outputs them as completed-frame data.

For example, each time the cell of the same connection is inputted, the memory write control unit executes an arithmetic operation for discriminating validity of data including the cell stored in the area in which the cell is written.

For example, when there is an error of validity of the data of one frame stored in the area, the memory write control unit abandons such a frame.

For example, if there is an error of validity of the data of one frame after the all cells of one frame are written into the area, the memory write control unit abandons such a frame.

The arithmetic operation for discriminating the validity of the data is, for example, a CRC (Cyclic Redundancy Check) logical arithmetic operation regarding a payload of each cell.

The arithmetic operation is, for example, a parity check logical arithmetic operation regarding a payload of each cell.

The arithmetic operation is, for example, an OR arithmetic operation of a Loss Priority bit regarding a header of each cell.

The arithmetic operation for discriminating the validity of the data is, for example, an AND arithmetic operation of a Loss Priority bit regarding a header of each cell.

For example, each time the cell of the same connection is inputted, the memory write control unit executes a logical arithmetic operation of data up to the cell in one frame of such a connection, outputs a result of the logical arithmetic operation until the last cell at a point of time when the cells of one frame have been written, and discriminates validity of the frame on the basis of the result of the logical arithmetic operation of each cell constructing the frame on the basis of the output result.

For example, each time the cell of the same connection is inputted, the memory write control unit measures an arrival interval in a range from an input of the cell that was inputted at timing of one cell before the input cell to an arrival of the subsequent input cell with respect to such a connection, and abandons the frame in the area regarding the connection of such a cell if the arrival interval exceeds a predetermined value.

For example, the memory write control unit measures an arrival interval in a range from an input of the first cell belonging to the frame of the same connection to an input of the last cell belonging to such a frame, and abandons the frame when the arrival interval exceeds a predetermined value.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

EMBODIMENT 1

<Construction>

Figure 1:
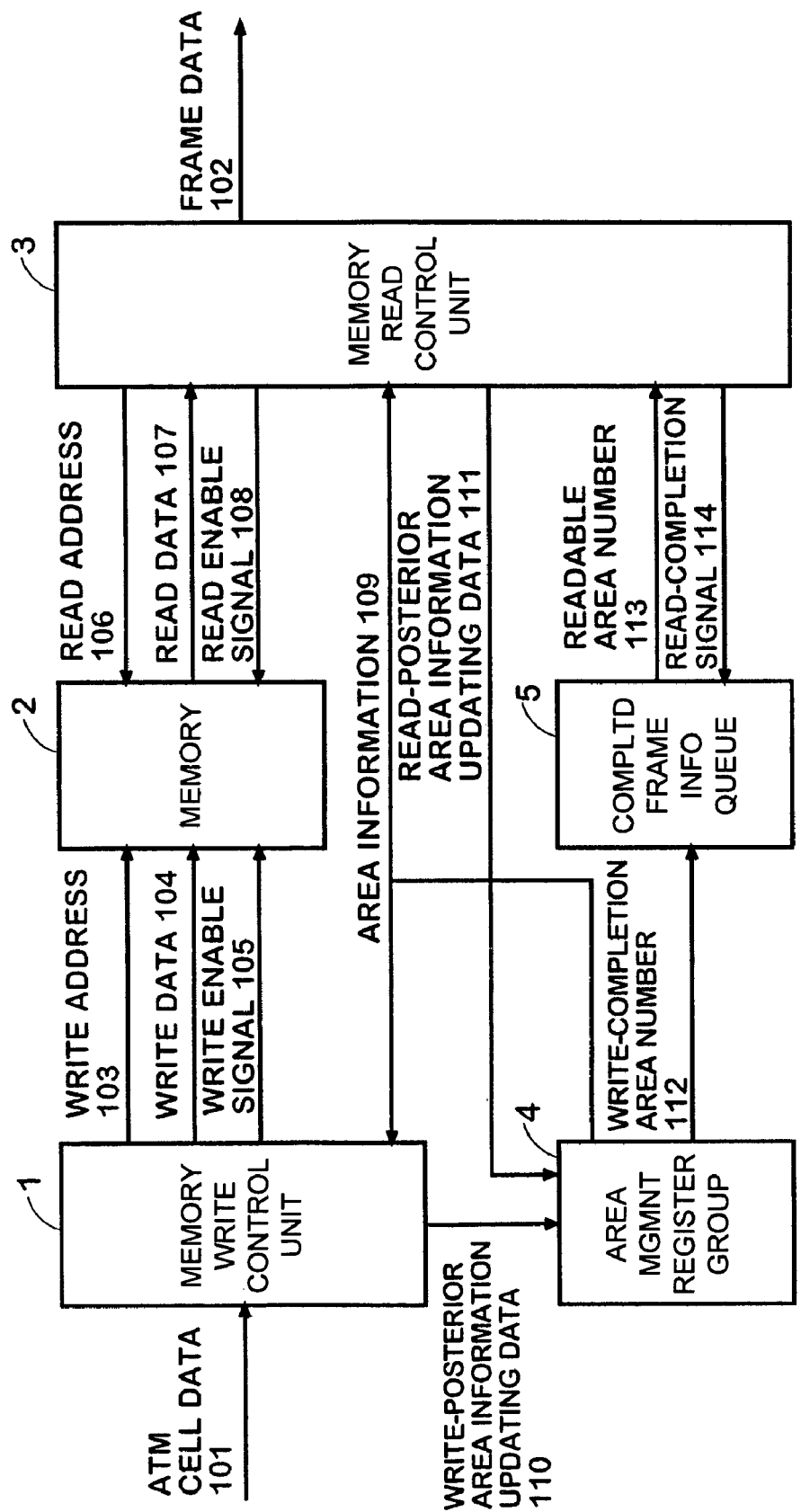
FIG. 1 is a constructional diagram showing the embodiment 1 of a communication control apparatus of the invention.

FIG. 1 is a constructional diagram showing the embodiment 1 of a communication control apparatus of the invention.

As shown in FIG. 1, the communication control apparatus according to the invention comprises: a memory write control unit 1; a memory 2 for assembling a frame (hereinafter, referred to as a frame assembly memory 2 or a memory 2); a memory read control unit 3; an area management register group 4; and a completed-frame information queue 5.

ATM cell data 101 and area information 109 are inputted to the memory write control unit 1. The memory write control unit 1 outputs a write address 103, write data 104, a write enable signal 105, and updating data 110. The updating data 110 is write-posterior area information updating data for updating the area information in the area management register group 4 after the write data 104 was written into the memory 2.

When the ATM cell data 101 of a new connection is inputted to the memory write control unit 1, the memory write control unit 1 allocates the connection to an empty area in the frame assembly memory 2 and writes the cell therein. If the ATM cell data which is inputted to the memory write control unit 1 is associated with the same connection as that of the ATM cell data which has already been allocated to any area, the memory write control unit 1 writes the ATM cell data into the area which has already been allocated. At this time, if all the cells of one frame have already been written into such an area, such a connection is allocated to another new area. The new inputted cell is written into this new area.

Figure 2:
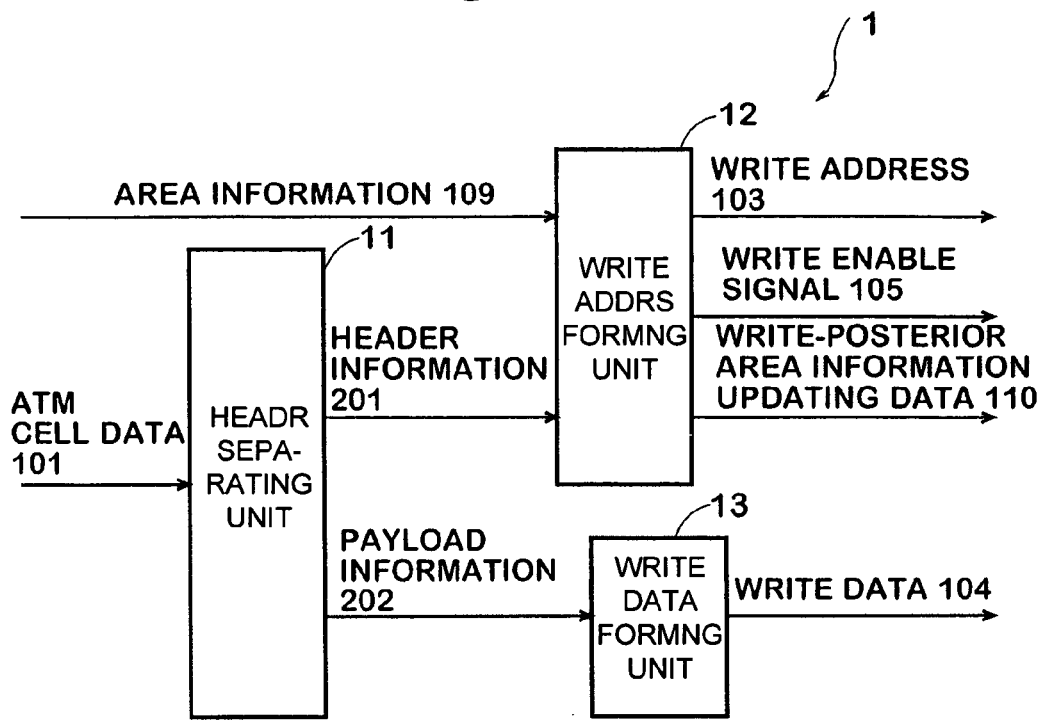
FIG. 2 is an internal constructional diagram of a memory write control unit in the embodiment 1.

FIG. 2 is an internal constructional diagram of the memory write control unit 1.

As shown in FIG. 2, the memory write control unit 1 has a header separating unit 11, an address forming unit 12, and a write data forming unit 13. The header separating unit 11 separates a header and a payload of the ATM cell data 101 which is inputted to the header separating unit 11. Header information 201 is outputted from the header separating unit 11 to the write address forming unit 12. Payload information 202 is outputted from the header separating unit 11 to the write data forming unit 13. The area information 109 is inputted to the write address forming unit 12. The write address forming unit 12 forms the write address 103 to the frame assembly memory 2 of the ATM cell data 101 on the basis of the area information 109 which is inputted to the write address forming unit and the header information 201 outputted from the header separating unit 11. In addition to the write address 103, the write address forming unit 12 outputs the write enable signal 105 and write-posterior area information updating data 110. The write data forming unit 13 forms the write data 104 to the frame assembly memory 2 on the basis of the payload information 202 outputted from the header separating unit 11.

Referring again to FIG. 1, when the assembly of one frame into the frame assembly memory 2 is completed by the writing of the ATM cell by the memory write control unit 1, the frame is read out by the memory read control unit 3.

A logical area in the frame assembly memory 2 is set to the maximum one of the lengths of the frames which are handled by the communication control apparatus. As a maximum frame length, it is possible to use a length obtained by adding an increase amount for allowance of a certain extent to the actual maximum frame length of the connection. The number of areas (area 0 to area M) is properly set in accordance with the communication control apparatus.

Figure 3:
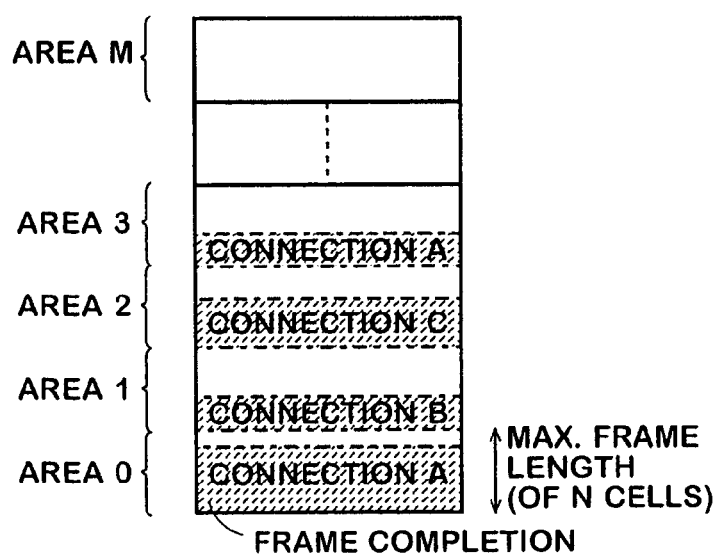
FIG. 3 is a constructional diagram of a frame assembly memory.

FIG. 3 is a constructional diagram of the frame assembly memory 2.

The whole area in the frame assembly memory 2 is logically separated into areas on a unit basis of the maximum length (corresponding to N cells here) of the frames which are handled. The memory write control unit 1 writes the cell into each corresponding area every connection regarding the received ATM cell. If the frame is completed in a certain area, the next and subsequent ATM cells regarding such a connection are written into the new empty area in the memory 2 by the memory write control unit 1.

In the example of FIG. 3, when the ATM cell belonging to the connection A, that is, regarding the connection A is inputted to the memory write control unit 1, the ATM cell is first written into the area 0 of the frame assembly memory 2 in an initial state. Subsequently, the ATM cell which belongs to the connection B and is inputted to the memory write control unit 1 is written into the area 1, and the ATM cell of the connection C is sequentially written into the area 2. After that, when a new ATM cell belonging to the connection A is again inputted, it is written into the area 0. In this case, when the frame in the area 0 is completed, this frame is read out from the frame assembly memory 2. In this case, before reading the frame from the memory 2, when the ATM cell of the connection A is further inputted, it is written into the new empty area (area 3).

The memory read control unit 3 shown in FIG. 1 reads out the assembly-completed frames from the frame assembly memory 2 in accordance with the frame order shown by the completed-frame information queue 5.

Figure 4:
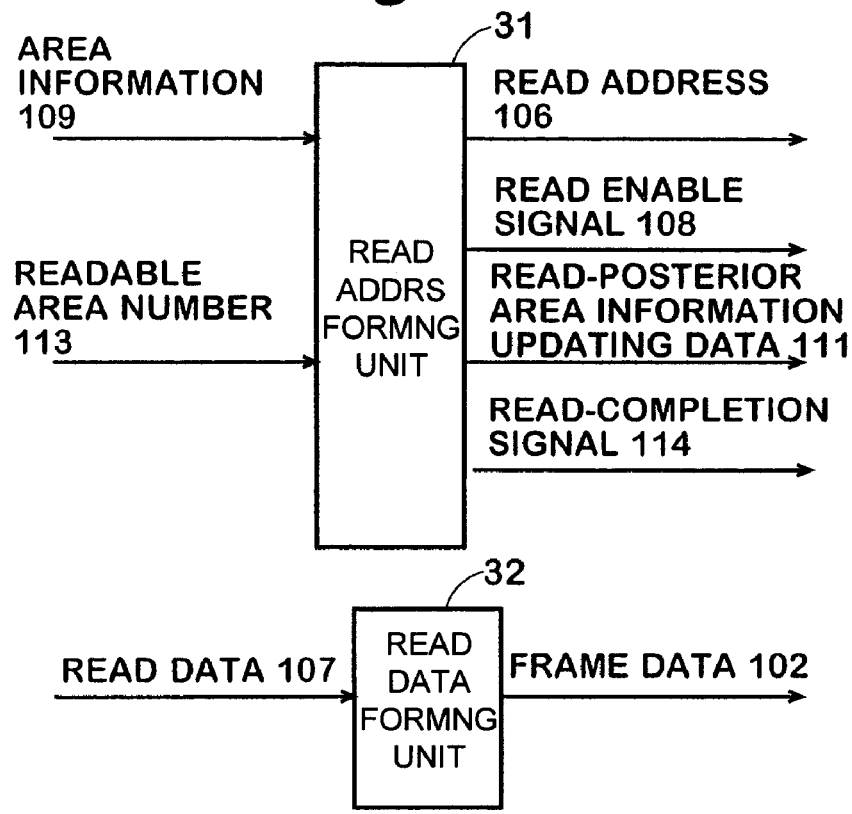
FIG. 4 is an internal constructional diagram of a memory read control unit.

FIG. 4 is an internal constructional diagram of the memory read control unit 3.

As shown in FIG. 4, the memory read control unit 3 has a read address forming unit 31 and a read data forming unit 32. The area information 109 and a readable-area number 113 are inputted to the read address forming unit 31. On the basis of those information, the read address forming unit 31 outputs a read address 106, a read enable signal 108, area information updating data 111, and read completion signal 114. The area information updating data 111 is data for updating the area information of the area management register group 4 after frame data 102, that is, read data 107 was read out from the frame assembly memory 2. The read data forming unit 32 outputs the read data 107 from frame assembly memory 2 to the outside as frame data 102.

The area management register group 4 shown in FIG. 1 is a register group for managing each area in the frame assembly memory 2.

Figure 5:
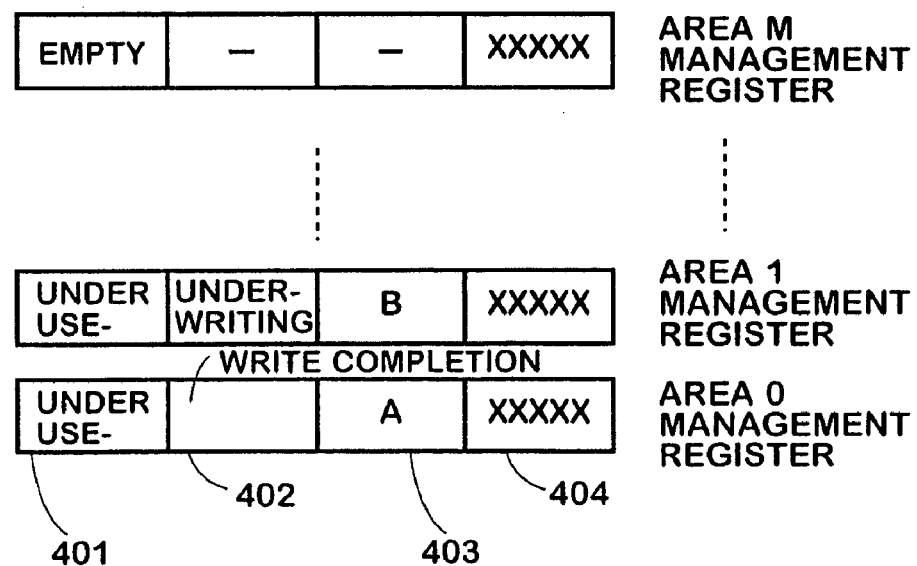
FIG. 5 is an internal constructional diagram of an area management register group in the embodiment 1.

FIG. 5 is an internal constructional diagram of the area management register group 4.

As shown in FIG. 5, area management registers exist in correspondence to the respective areas (area 0 to area M) in the frame assembly memory 2 which was logically separated. Contents which are managed by each register are each information regarding a using state 401, a writing state 402, a connection number 403, and a write address 404.

The using state 401 indicates whether the area is in an under-use state (that is, the area is being used or has already been used) or is in an empty state. In the initial state, the using state 401 shows the empty state. The using state 401 indicates the under-use state during the writing operation or after completion of the writing (also including the state during the reading operation). After completion of the reading operation, the using state 401 is returned to the empty state again. The writing state 402 indicates whether the area is in a state where the data is being written or a write completion state (also including a state where the area waits for the reading and a state where the data is being read out). The connection number 403 indicates the number of the connection to which the cell (frame) data which has been written in the relevant area belongs. The write address 404 indicates a start address (address in the area) in case of writing the next data into the relevant area. In the initial state, the write address 404 indicates "0".

Figure 6:
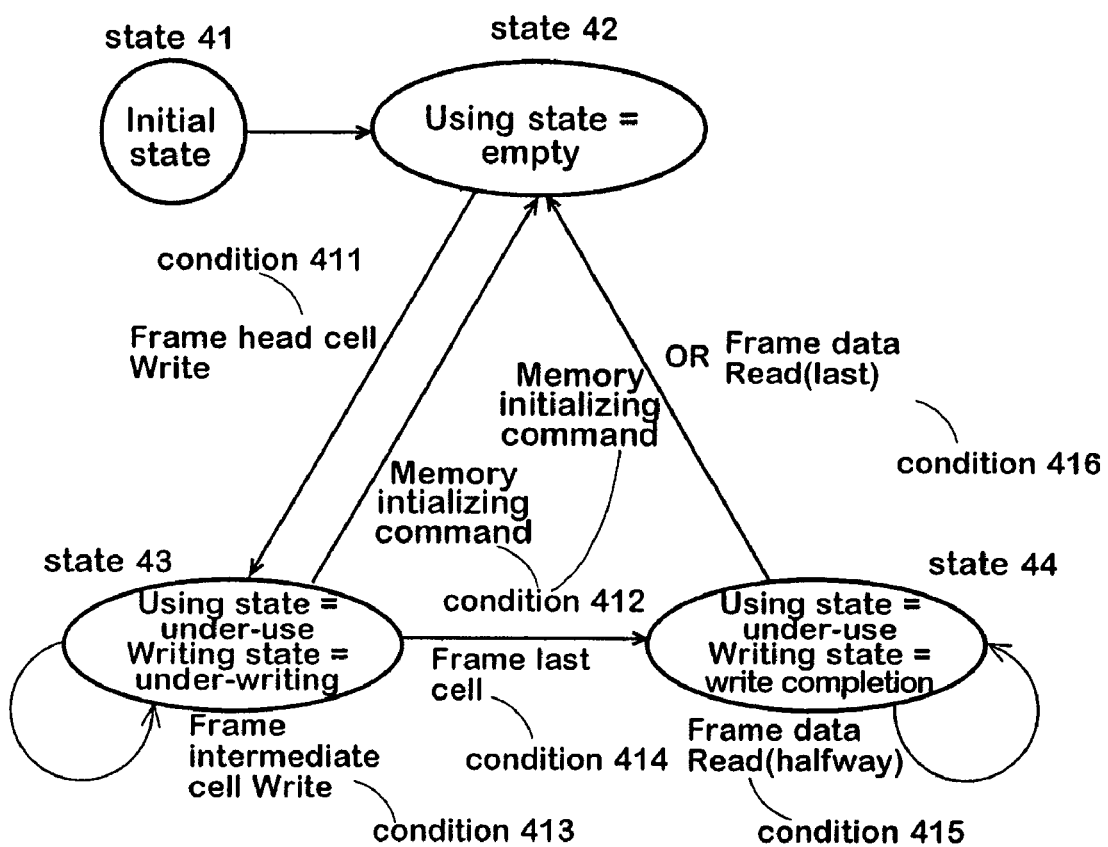
FIG. 6 is a state transition diagram in the area management register group in the embodiment 1.

FIG. 6 is a state transition diagram in the area management register group 4.

First, the state is shifted from an initial state (state 41) to a state 42 "using state=empty". Subsequently, when the writing operation is executed to the relevant area, that is, when head cell data forming a certain frame is written (condition 411), the state is shifted to a state 43 "using state=under-use, writing state=under-writing". Further, while the writing of the second and subsequent cells of the relevant frame is continuing (condition 413), the state remains in the state 43. When the last cell data forming the relevant frame is written (condition 414), the state is shifted to a state 44 "using state=under-use, writing state=completion of writing". After that, the reading operation is started. While the completed frame is being read (condition 415), the state remains in the state 44. When all of the frames are read out (condition 416), the state is returned to the first state 42 "using state=empty". When a memory initializing command is executed in the state 43 or 44 (condition 412), the state is returned to the state 42 anytime.

The completed-frame information queue 5 shown in FIG. 1 is a first-in first-out memory for sequentially reading out the assembly-completed frames in the frame assembly memory 2. If write completion area number 112 is inputted which is given from the area management register group 4, the number 112 stored in the queue 5 is outputted as readable-area number 113 to the memory read control unit 3 in inputting order.

Figure 7:
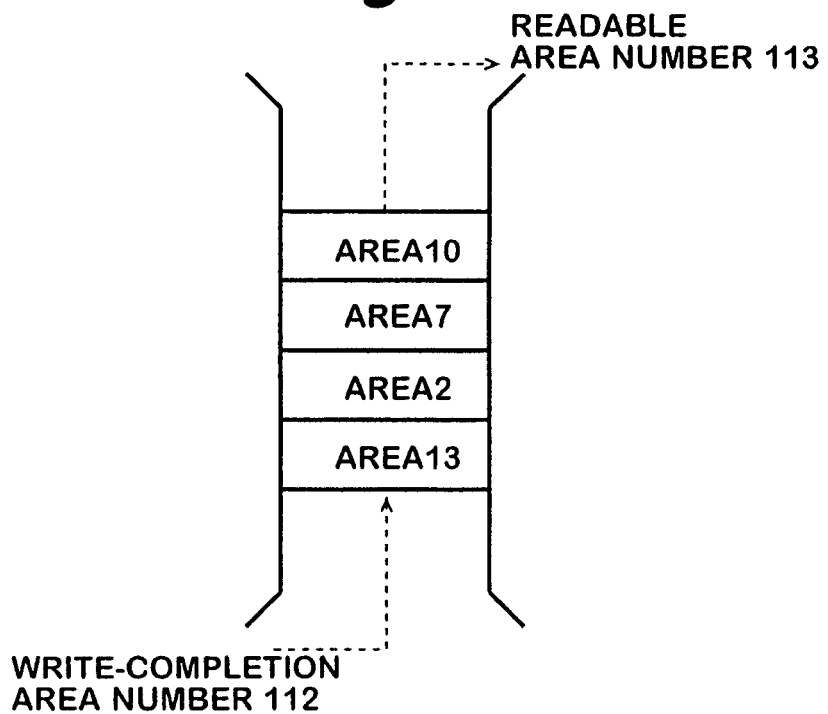
FIG. 7 is an explanatory diagram of a completed-frame information queue.

FIG. 7 is an explanatory diagram of the completed-frame information queue 5.

When the writing of the cell data is completed and the frame-completed area numbers (write completion area number 112) is inputted to the queue 5, it is stored into the queue 5 in time order. On the other hand, the area numbers 112 stored in the queue 5 are sequentially outputted as readable-area number 113 from the head. The read-completed area number is deleted from the queue 5.

<Operation>

The operation of the embodiment 1 will now be described.

The arrived ATM cell data 101 is inputted to the memory write control unit 1.

In the memory write control unit 1, the inputted ATM cell data 101 is separated into the header information 201 and payload information 202 by the header separating unit 11.

Figure 8:
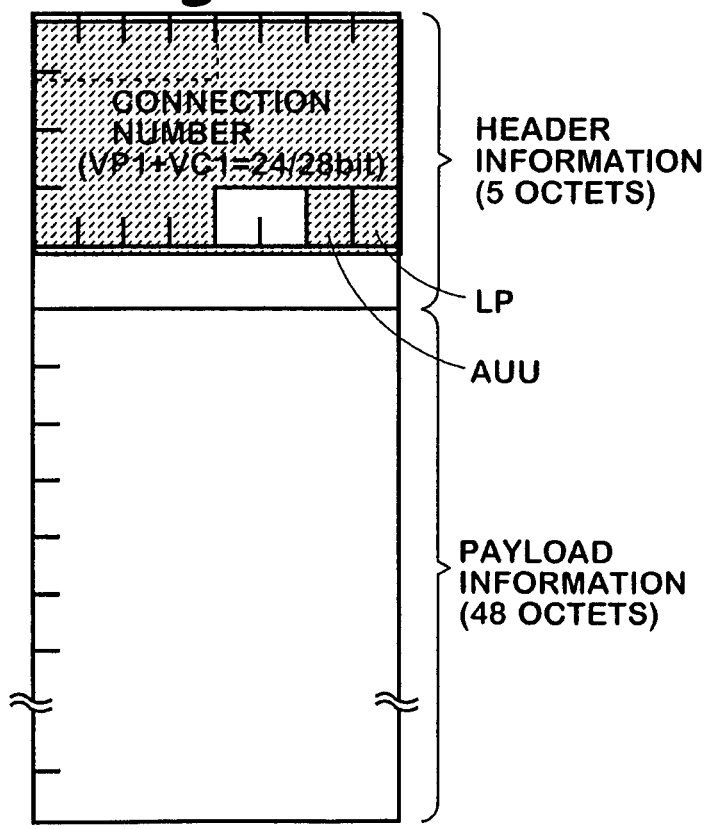
FIG. 8 is an explanatory diagram of an ATM cell format.

FIG. 8 is an explanatory diagram of an ATM cell format.

The connection number comprising a VPI and a VCI is included in the header information of the ATM cell. The memory write control unit 1 sets the area of the frame assembly memory 2 on the basis of the connection number.

The header information 201 separated by the header separating unit 11 (what is actually necessary is the connection number in the header information) is inputted to the write address forming unit 12. The area information 109 from the area management register group 4 is also inputted to the write address forming unit 12. On the basis of those input signals, the write address forming unit 12 forms the write address 103, write enable signal 105, and write-posterior area information updating data 110.

Figure 9:
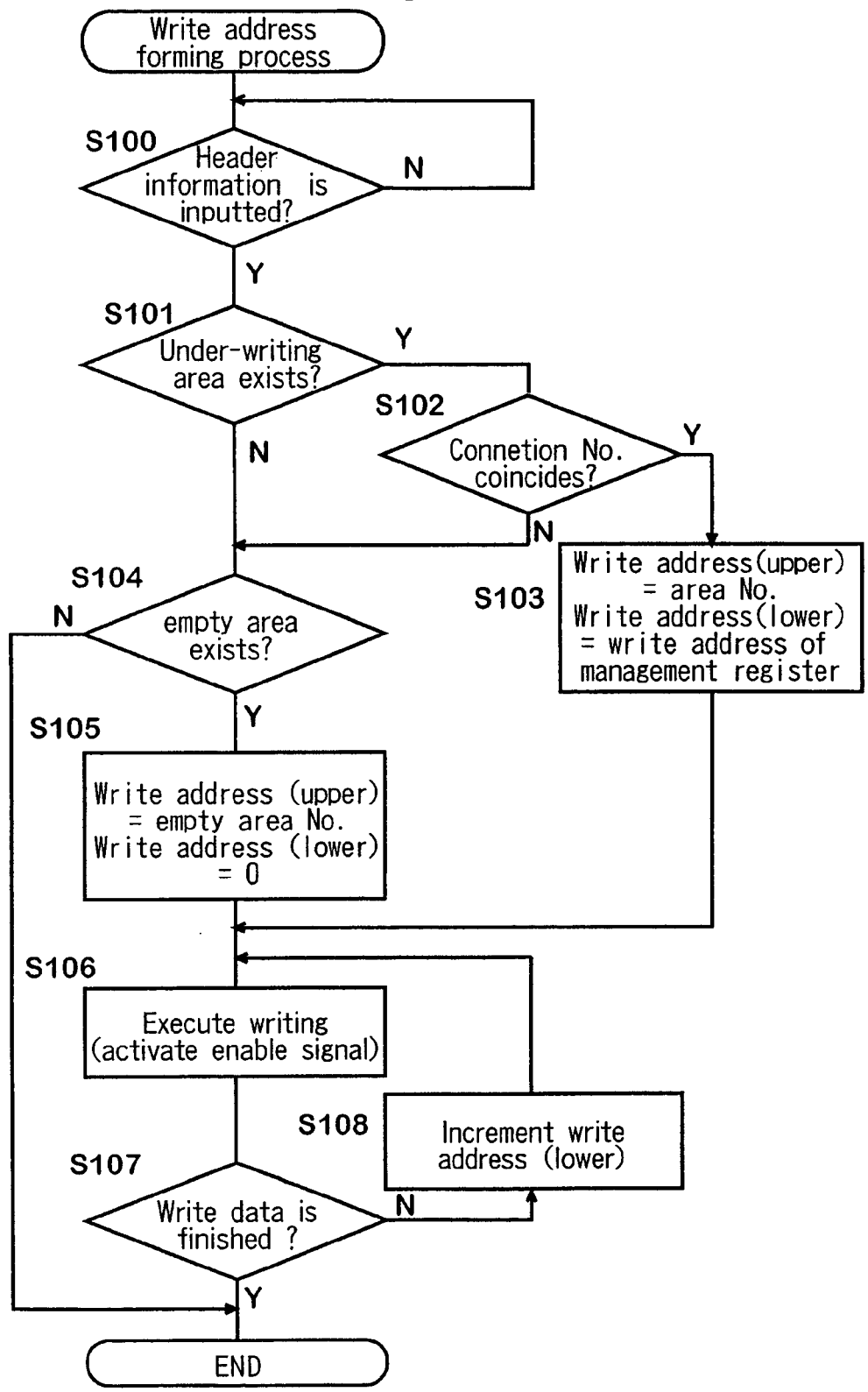
FIG. 9 is a flowchart for a writing process.

FIG. 9 is a flowchart showing a writing process.

The write address is divided into an upper part and a lower part. The upper part corresponds to each area number. The lower part corresponds to the address in such an area.

First, the memory write control unit 1 is in a standby mode until the header information is inputted (step S100). When the header information is inputted, the presence or absence of the area during the writing operation is discriminated on the basis of the area information 109 (step S101). If such an area exists (there is also a case where a plurality of areas exist) in step S101, step S102 follows. Whether the connection number which coincides with that of the header information 201 exists among the connection numbers to which the frame that is being written into such an area belongs or not is discriminated. If YES, the area number (that is, a corresponding physical address converted from the area number) is set into the upper part of the write address, and the write address which is managed by the area management register is set into the lower part of the write address (step S103).

If the area does not exist in step S101 and if all of the connection numbers do not coincide in step S102, the presence or absence of the area in the empty state is discriminated by the area information 109 (step S104). If the area in the empty state does not exist, the processing routine is finished. If the area in the empty state exists in step S104, the empty area number (that is, a corresponding physical address converted from the empty area number) is set into the upper part of the write address, and the initial value "0" is set into the lower part of the write address (step S105).

After that, the write enable signal 105 is activated and the writing operation is executed (step S106). Subsequently, whether the write data still remains or not is discriminated (step S107). If YES, the lower part of the write address is incremented (step S108) and the processing routine is returned to step S106. The above processes are repeated in this manner until the writing of all of the data is finished. If it is determined in step S107 that the write data has been finished, the processing routine is finished.

After completion of the series of writing operation, the area management register is updated in accordance with the state transition shown in FIG. 6 (write-posterior area information updating data 110). In this instance, whether the written cell is the last cell of the frame or not is discriminated on the basis of the information in the cell header area. For example, in case of the AAL5 protocol process (refer to ITU-T I 363.5), information of AUU (ATM User-to-User indication) shown in FIG. 8 is used for discriminating whether the written cell is the last cell of the frame or not.

The payload information 202 separated by the header separating unit 11 in FIG. 2 is outputted as write data 104 by the write data forming unit 13 synchronously with the timing of the write address 103 and write enable signal 105. In this manner, the writing of the frame data into the frame assembly memory 2 is realized by the write address 103, write data 104, and write enable signal 105.

In the area management register group 4, the area management information obtained after the writing is updated by the memory write control unit 1, so that if the frame is completed (the state is shifted to the state 44 in FIG. 6), the area number of the relevant area is sent as a write completion area number 112 to the completed-frame information queue 5. The completed-frame information queue 5 stores the inputted write completion area number 112 and sends only the oldest one stored as a readable-area number 113 to the memory read control unit 3.

The memory read control unit 3 sends the inputted readable-area number 113 to the read address forming unit 31. The read address forming unit 31 further forms the read address 106 and read enable signal 108 also by using the area information 109 from the area management register group 4.

Figure 10:
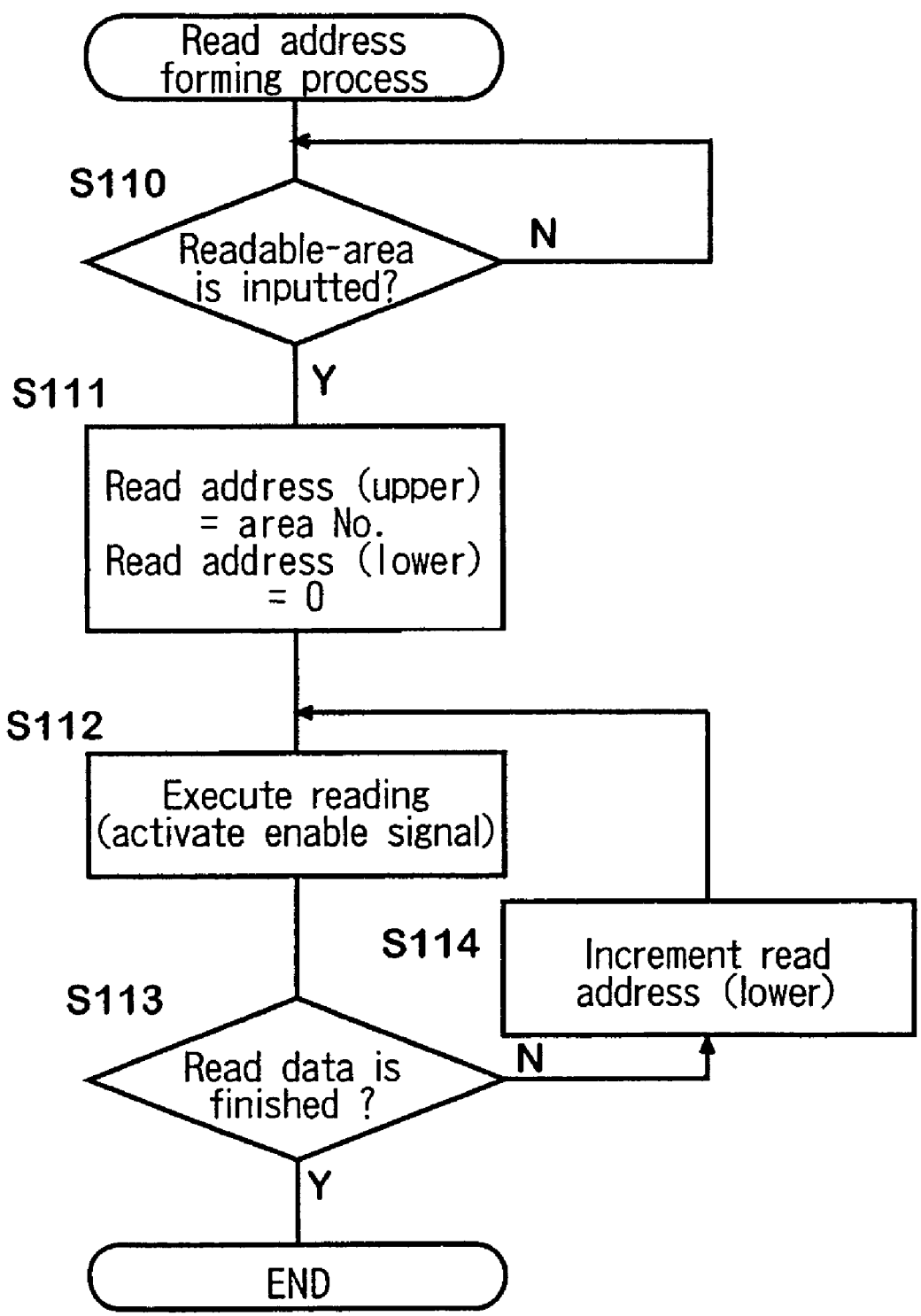
FIG. 10 is a flowchart for forming a reading process.

FIG. 10 is a flowchart for a reading process.

The read address is separated into an upper part and a lower part. The upper part corresponds to each area number. The lower part corresponds to the address in such an area.

In FIG. 10, the memory read control unit 3 is in a standby mode until the readable-area number 113 is inputted (step S110). When the readable-area number 113 is inputted, the area number (that is, a corresponding physical address converted from the readable-area number) is set into the upper part of the read address, and the initial value "0" is set into the lower part of the read address (step S111). After that, the read enable signal 108 is activated and the reading operation is executed (step S112). Subsequently, whether all of the data has been read out or not is discriminated by using the write address 404 (refer to FIG. 5) in the area management register (step S113). That is, if the present read address coincides with the address obtained by subtracting "1" from the write address 404, this means that all of the data has been read out. If the reading operation is not completed yet, the lower part of the read address is incremented (step S114) and the processing routine is returned to step S112. The above processes are repeated in this manner until the reading of all of the data is finished.

After completion of the series of reading operation, the read address forming unit 31 executes the updating operation of the area management register in accordance with the state transition shown in FIG. 6 (read-posterior area information updating data 111) and, further, sends the read completion signal 114 to the completed-frame information queue 5.

The read data 107 read out from the frame assembly memory 2 is outputted as frame data 102 by the read data forming unit 32.

In the completed-frame information queue 5, by receiving the read completion signal 114 from the memory read control unit 3, the head (oldest) area number in the queue is abandoned and the area number which newly becomes the head area number is outputted as a readable-area number 113 to the memory read control unit 3.

<Effects>

As mentioned above, according to the embodiments, the following effects are obtained.

① Since the frame assembly memory 2 is not fixedly allocated in correspondence to the connection, when seeing from a viewpoint of a local time width, it is permitted that a large deviation occurs in a memory occupation ratio of each connection number (for example, 50% of the memory capacity is occupied by one connection, or the like). Thus, the memory as a limited resource can be maximally and effectively used by utilizing a statistic multiple effect as one of the features of the ATM system which handles a plurality of connections.

② Since the frame assembly memory 2 is not fixedly allocated in correspondence to the connection, there is no need to restrict a range of the connection numbers which are handled, a degree of freedom on the system design can be increased.

③ Since the frame assembly memory 2 is not fixedly allocated in correspondence to the connection, there is no need to convert the connection number into a local ID only in the apparatus, so that there is no need to have a circuit and a conversion table for this purpose.

④ By logically dividing the frame assembly memory 2 on a maximum frame length unit basis and using it, chain information between the cells belonging to the same frame (information to manage how to form one frame by coupling which cells) and the like which are necessary when the memory 2 is divided on a cell length unit basis are unnecessary, and the control can be simplified.

⑤ Since the completed-frame information queue 5 having the FIFO structure is used, the frame data can be easily outputted while maintaining the time order between the frames.

EMBODIMENT 2

The embodiment 2 shows an example in which an arithmetic operation for discriminating the validity of the stored data is executed each time the cell data is stored into the frame assembly memory 2 in addition to the construction of the embodiment 1. In the embodiment 2, a CRC arithmetic operation as an arithmetic operation of the validity will be explained as an example.

<Construction>

Figure 11:
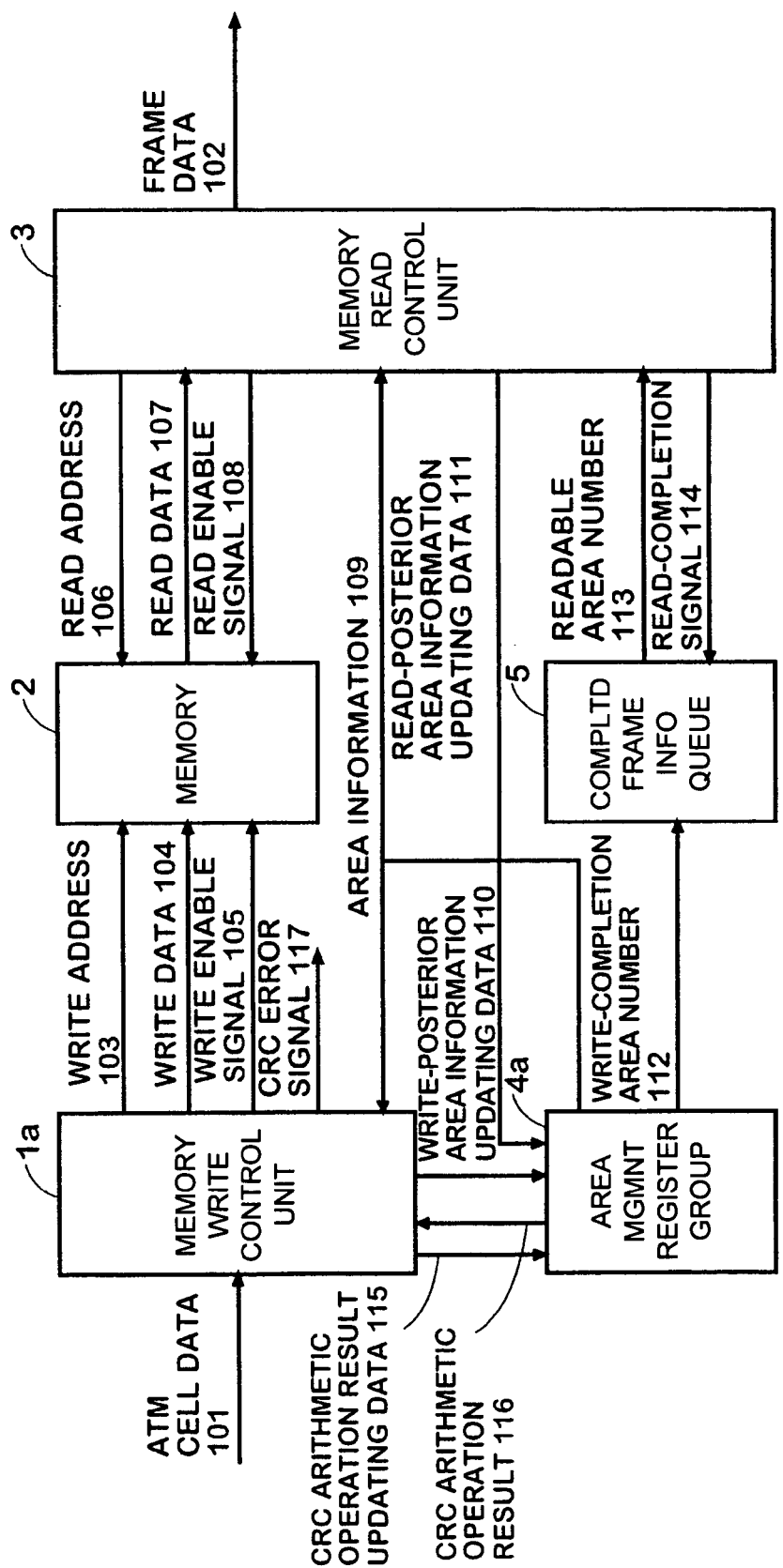
FIG. 11 is a constructional diagram of the embodiment 2.

FIG. 11 is a constructional diagram of the embodiment 2.

A communication control apparatus in the embodiment 2 differs from that in the embodiment 1 with respect to constructions of a memory write control unit 1*a* and an area management register group 4*a*. The following signals are added in association with it; that is, CRC arithmetic operation result updating data 115 and a CRC error signal 117 which are outputted from the memory write control unit 1*a* and a CRC arithmetic operation result 116 which is outputted from the area management register group 4*a*. The CRC arithmetic operation result updating data 115 is inputted to the area management register group 4*a*. The CRC arithmetic operation result 116 is inputted to the memory write control unit 1*a*.

Figure 12:
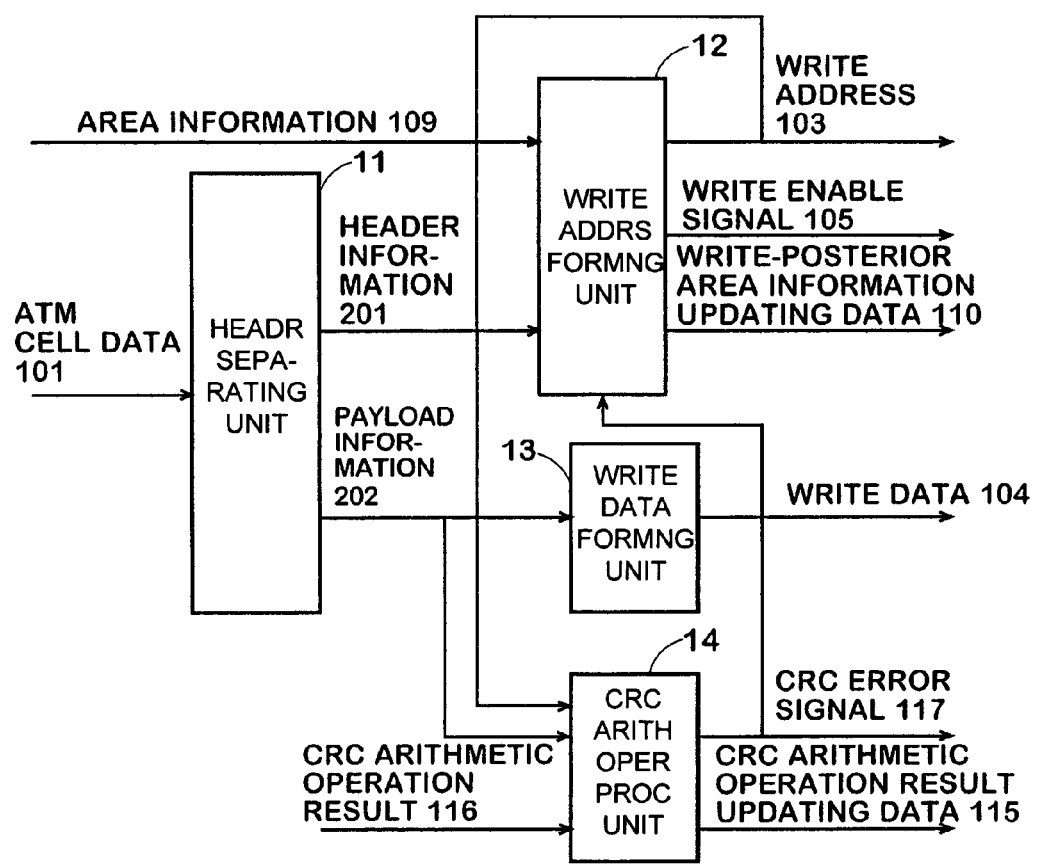
FIG. 12 is an internal constructional diagram of a memory write control unit in the embodiment 2.

FIG. 12 is an internal constructional diagram of the memory write control unit 1*a*.

The memory write control unit 1*a* differs from the memory write control unit 1 in the embodiment 1 with respect to a point that a CRC arithmetic operation processing unit 14 is added. The write address 103, payload information 202, and CRC arithmetic operation result 116 are inputted to the CRC arithmetic operation processing unit 14. The CRC arithmetic operation result updating data 115 and the CRC error signal 117 are outputted from the CRC arithmetic operation processing unit 14. The CRC error signal 117 is notified as a warning to the outside and also inputted to the write address forming unit 12. That is, each time the cells of the same connection are inputted, the memory write control unit 1*a* in the embodiment 2 executes a CRC arithmetic operation of the data up to the inputted cells in one frame of this connection. At a point when all the cells of one frame are written, whether there is an error in a CRC arithmetic operation result of the data of up to the last cell or not is discriminated. If there is an error, this frame is abandoned.

Figure 13:
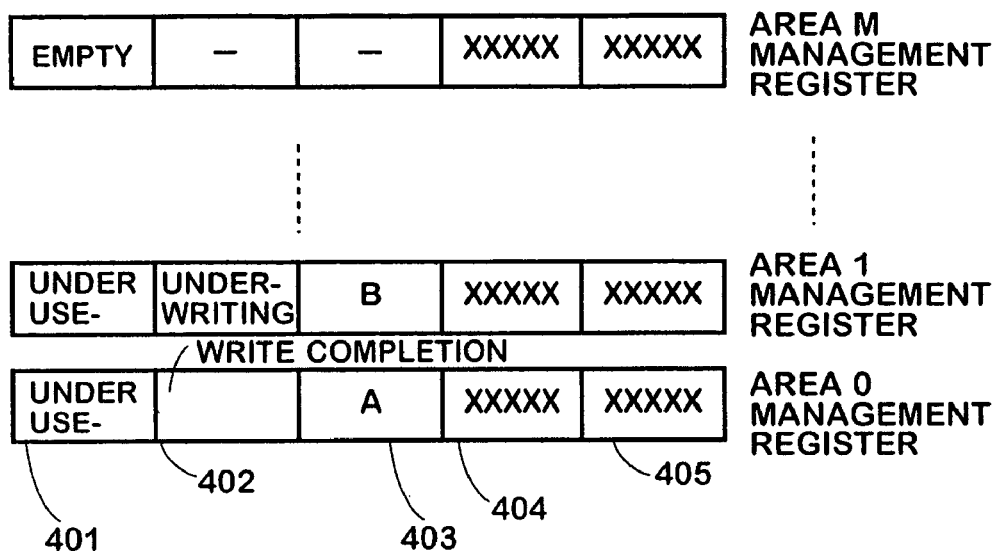
FIG. 13 is an internal constructional diagram of an area management register group in the embodiment 2.

FIG. 13 is an internal constructional diagram of the area management register group 4*a*.

The area management register group 4*a* differs from the area management register group 4 in the embodiment 1 with respect to a point that a CRC arithmetic operation result 405 is added. The CRC arithmetic operation result 405 indicates a CRC arithmetic operation result of the cell data stored in the relevant area at a point when each cell is inputted.

In the diagrams, since each of the other constructions is similar to that in the embodiment 1, the same and corresponding component elements are designated by the same reference numerals and their descriptions are omitted here.

<Operation>

The operation of the embodiment 2 will be described mainly with respect to points different from those in the embodiment 1.

For example, in the AAL5 protocol process (refer to ITU-T I 363.5), a trailer for storing various control information is provided at the end of the frame.

Figure 14:
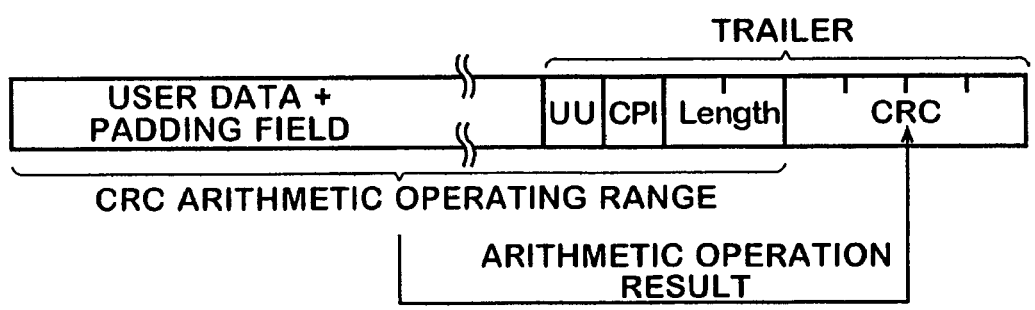
FIG. 14 is an explanatory diagram of a frame format of an AAL5 protocol.

FIG. 14 is an explanatory diagram of a frame format of the AAL5 protocol.

There is a CRC field in the trailer. A result of a CRC arithmetic operation executed to portions other than such a field on the transmission side has been stored in the CRC field. In a corresponding frame assembly processing unit on the reception side, a CRC arithmetic operation is executed to a similar range when a frame is assembled from the ATM cell. A CRC arithmetic operation result is compared with the value in the CRC field, thereby guaranteeing the validity of the frame data, that is, the absence of the error. The embodiment 2 is constructed on the assumption of the processes as mentioned above.

The CRC arithmetic operation processing unit 14 (refer to FIG. 12) of the memory write control unit 1*a* continues the CRC arithmetic operation by using a halfway result (CRC arithmetic operation result 116) of up to the previous time stored in the area management register corresponding to the write address 103 with respect to the payload information 202 separated by the header separating unit 11. A result of the CRC arithmetic operation is updated and stored as CRC arithmetic operation result updating data 115 into the area management register.

In a manner similar to the above, a CRC arithmetic operation is executed and, with respect to the last cell of the frame, it is compared with the value in the trailer after completion of the CRC arithmetic operation. If there is an error, the CRC error signal 117 is outputted and, at the same time, this frame is abandoned by the operation of the write-posterior area information updating data 110 of the write address forming unit 12. Specifically speaking, the frame is abandoned as follows.

Figure 15:
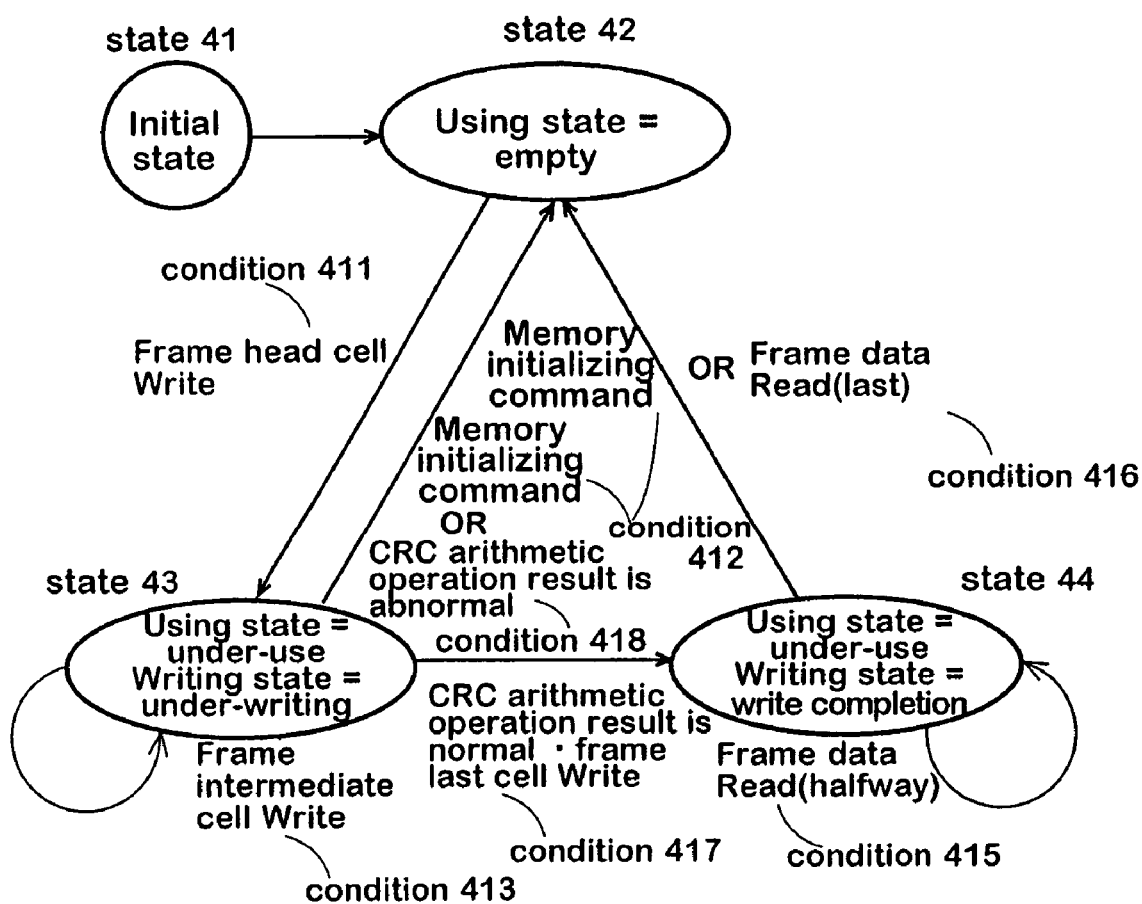
FIG. 15 is a state transition diagram in the area management register group in the embodiment 2.

FIG. 15 is a state transition diagram of the area management register group 4*a*.

A state transition in the embodiment 2 differs from that in the embodiment 1 with respect to a point that the condition 414 is eliminated and conditions 417 and 418 are added. That is, when the last cell of the frame arrives in the state 43, if the CRC arithmetic operation result is normal, the state is shifted to the state 44 in a manner similar to the embodiment 1. However, if there is an abnormality in the arithmetic operation result, the state is returned to the initial state 42, thereby realizing the abandonment of the frame data.

Although the construction and the operation of the embodiment 2 have been specifically described with respect to the AAL5 (ATM adaption layer 5) protocol process as an example by limiting to the CRC arithmetic operation for the frame, the invention is not limited to such an arithmetic operation. A similar other logical arithmetic operation (for example, parity arithmetic operation) of the validity of data can be also realized by similar construction and operation.

<Effects>

According to the embodiment 2 as mentioned above, the following effects are obtained in addition to the effects of the embodiment 1.

① Like an AAL5 protocol mentioned in the embodiment, when it is necessary to execute the CRC arithmetic operation for the whole frame or a similar logical arithmetic operation (for example, parity arithmetic operation), by previously executing the arithmetic operation on an arrived cell unit basis, the arithmetic operation can be soon completed when the last cell of the frame arrives. A process corresponding to the arithmetic operation result can be promptly executed.

② When the CRC arithmetic operation result is abnormal or the result of the similar logical arithmetic operation is abnormal (for example, parity abnormality), by returning the area management register to the initial state, the abandonment of the frame data can be easily realized.

EMBODIMENT 3

The embodiment 3 intends to execute a logical arithmetic operation for the header of the ATM cell. That is, the logical arithmetic operation for the payload of the cell is executed as a process of the AAL layer in the embodiment 2. In the embodiment 3, the logical arithmetic operation for the header (specific bit in the header) of the cell is executed with respect to processes of the ATM layer. In the embodiment 3, an OR arithmetic operation of an LP (Loss Priority) bit of the cell will be explained as an example of the arithmetic operations.

<Construction>

Figure 16:
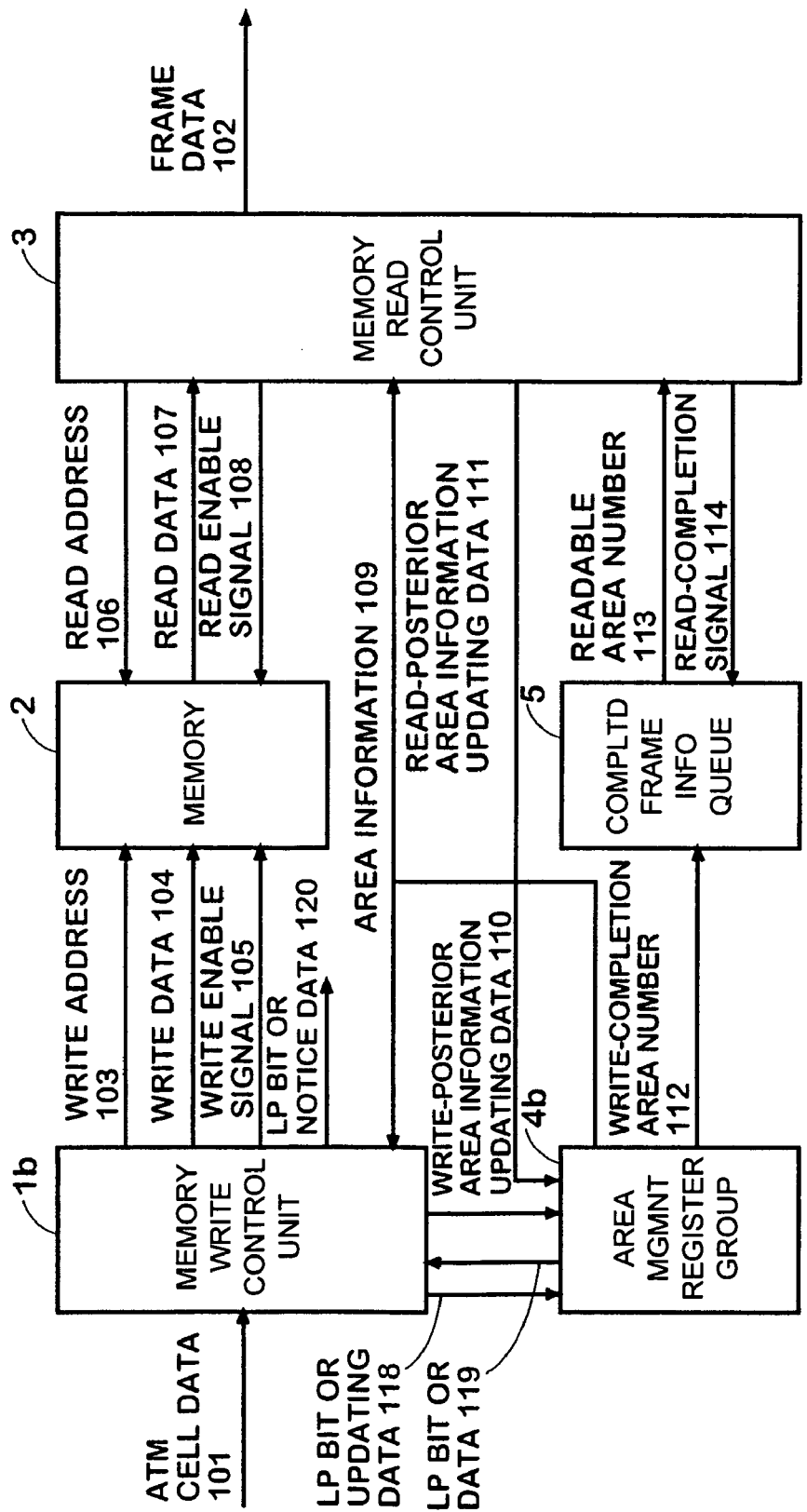
FIG. 16 is a constructional diagram of the embodiment 3.

FIG. 16 is a constructional diagram of the embodiment 3.

A communication control apparatus of the embodiment 3 differs from that in the embodiment 1 with respect to constructions of a memory write control unit 1b and an area management register group 4b. The following signals are added in association with it; that is, LP bit OR updating data 118 and LP bit OR notice data 120 which are outputted from the memory write control unit 1b and LP bit OR data 119 which is outputted from the area management register group 4b. The LP bit OR updating data 118 is inputted to the area management register group 4b. The LP bit OR data 119 is inputted to the memory write control unit 1b.

Figure 17:
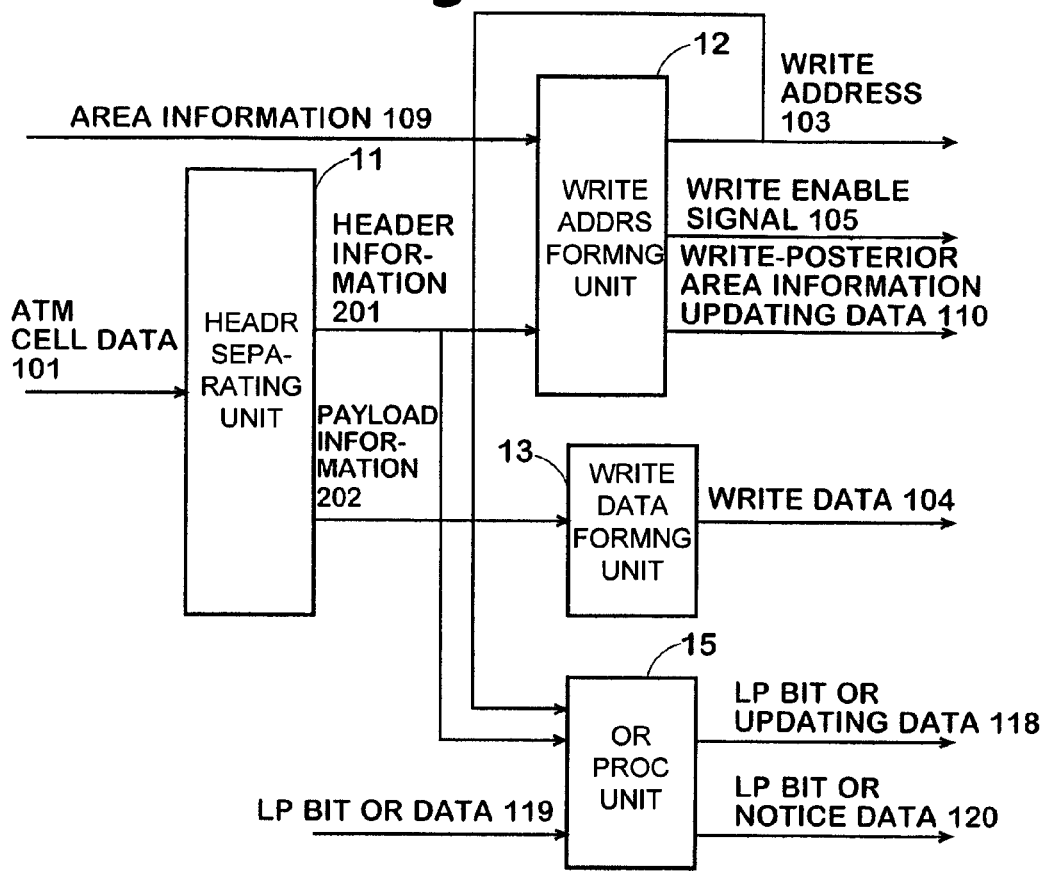
FIG. 17 is an internal constructional diagram of a memory write control unit in the embodiment 3.

FIG. 17 is an internal constructional diagram of the memory write control unit 1b.

The memory write control unit 1b in the embodiment 3 differs from the memory write control unit 1 in the embodiment 1 with respect to a point that an LP bit OR processing unit 15 is added. The write address 103, header information 201, and LP bit OR data 119 are inputted to the LP bit OR processing unit 15. The LP bit OR updating data 118 and LP bit OR notice data 120 are outputted from the LP bit OR processing unit 15. That is, in a manner similar to the foregoing example, in order to obtain the logical arithmetic operation result of the frame on the basis of the logical arithmetic operation result of the LP bit of each cell constructing the frame, each time the cells of the same connection are inputted, the memory write control unit 1b in the embodiment 3 executes a logical arithmetic operation of the data up to the inputted cells in one frame of this connection.

At a point when all the cells of one frame are written, the logical arithmetic operation result of up to the last cell is outputted.

Figure 18:
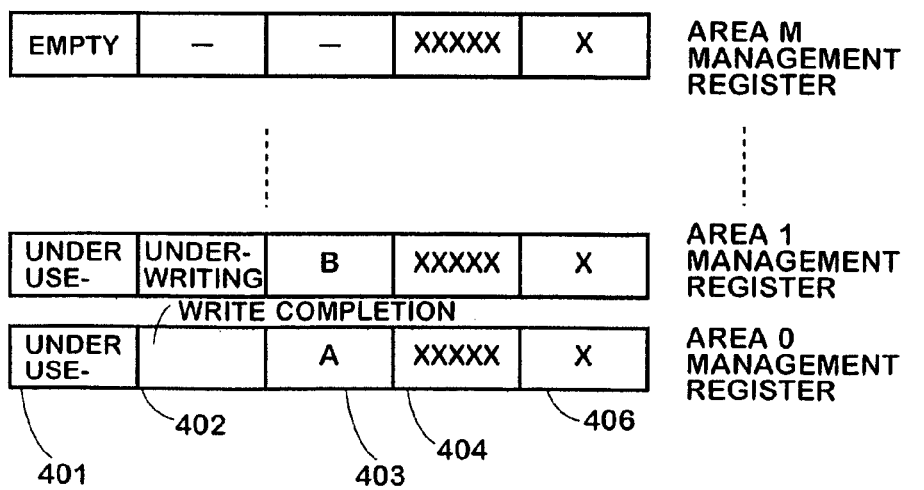
FIG. 18 is an internal constructional diagram of an area management register group in the embodiment 3.

FIG. 18 is an internal constructional diagram of the area management register group 4b.

The area management register group 4b differs from the area management register group 4 in the embodiment 1 with respect to a point that LP bit OR data 406 is added. The LP bit OR data 406 indicates an OR arithmetic operation result of all of the cell data LP bits stored in the relevant area at that point of time.

In the diagrams, since each of the other constructions is similar to that in the embodiment 1, the same and corresponding component elements are designated by the same reference numerals and their descriptions are omitted here.

<Operation>

The operation of the embodiment 3 will be described mainly with respect to points different from those in the embodiment 1.

For example, in the AAL5 protocol process (refer to ITU-T I 363.5), OR arithmetic operation results of the LP bits (LP bits in FIG. 8) in the headers of all of the ATM cells constructing a certain frame are obtained and defined as LP bits for the relevant frame.

Figure 19:
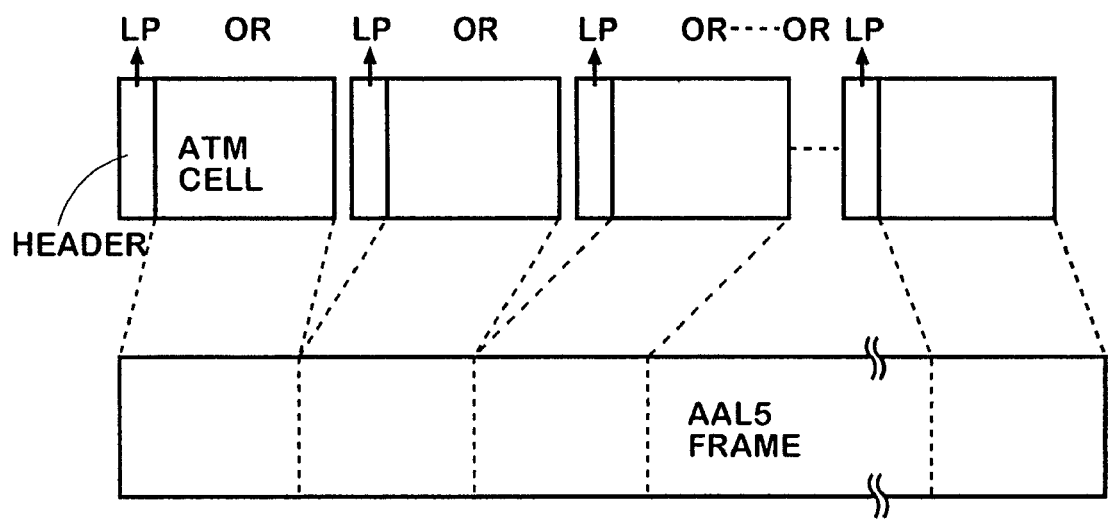
FIG. 19 is an explanatory diagram of LP bits of the frame of the AAL5 protocol.

FIG. 19 is an explanatory diagram of the LP bit of the frame of the AAL5 protocol.

As shown in the diagram, in the AAL5 frame, the OR arithmetic operation results of the LP bits of all of the ATM cells constructing this frame are obtained. A result obtained by executing an OR arithmetic operation to the OR arithmetic operation results regarding those cells becomes an OR arithmetic operation result of the AAL5 frame. The embodiment 3 is made on the assumption of such processes as mentioned above.

The LP bit OR processing unit 15 (refer to FIG. 17) of the memory write control unit 1b obtains OR information (LP bit OR data 119) of the LPs of up to the cells stored in the area management register corresponding to the write address 103 with respect to the LP bit in the header information 201 separated by the header separating unit 11. An obtained result is stored as LP bit OR updating data 118 into the area management register.

OR processes of LP bits of all of the cells constructing the frame are executed in a manner similar to the above. Finally, a result is outputted as LP bit OR notice data 120 for this frame.

Although the construction and the operation of the embodiment 3 have been specifically described with respect to the AAL5 protocol process as an example by limiting to the OR arithmetic operation of the LP bit in the ATM cell header, the invention is not limited to such an arithmetic operation. A logical arithmetic operation with relation to other information in the cell or other than the OR arithmetic operation (for example, an AND arithmetic operation of all of the cells is executed or the like) can be also realized by similar construction and operation.

<Effects>

As described above, according to the embodiment 3, the following effects are obtained in addition to the effects of the embodiment 1. That is, like an AAL5 protocol mentioned in the embodiment 3, when it is necessary to execute the OR process or other arithmetic operating processes to the LP bits included in all of the ATM cell headers constructing the frame or other information, by previously executing the arithmetic operation on an arrived cell unit basis, the arithmetic operation can be soon completed when the last cell of the frame arrives. A process corresponding to the arithmetic operation result can be promptly executed.

EMBODIMENT 4

The embodiment 4 shows an example in which whether the arrival interval of each cell or the arrival time of the cells of one frame is equal to or less than a predetermined value or not is discriminated. In case of a time-out, such a frame is abandoned.

<Construction>

Figure 20:
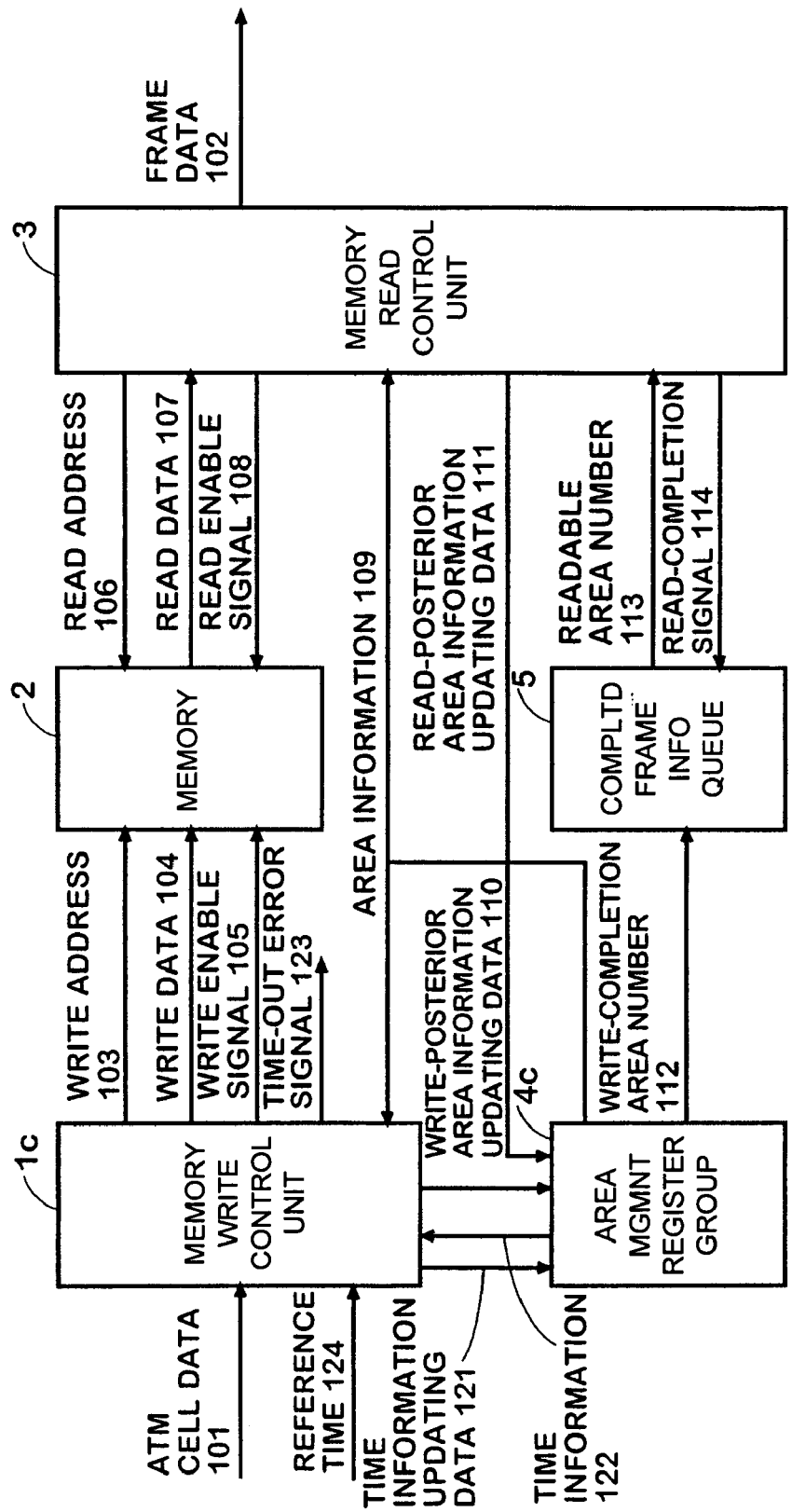
FIG. 20 is a constructional diagram of the embodiment 4.

FIG. 20 is a constructional diagram of the embodiment 4.

A communication control apparatus of the embodiment 4 differs from that in the embodiment 1 with respect to constructions of a memory write control unit 1c and an area management register group 4c. The following signals are added in association with it; that is, time information updating data 121 and a time-out error signal 123 which are outputted from the memory write control unit 1c, a reference time 124 which is inputted to the memory write control unit 1c, and time information 122 which is outputted from the area management register group 4c. The time information updating data 121 is inputted to the area management register group 4c. The time information 122 is inputted to the memory write control unit 1c.

Figure 21:
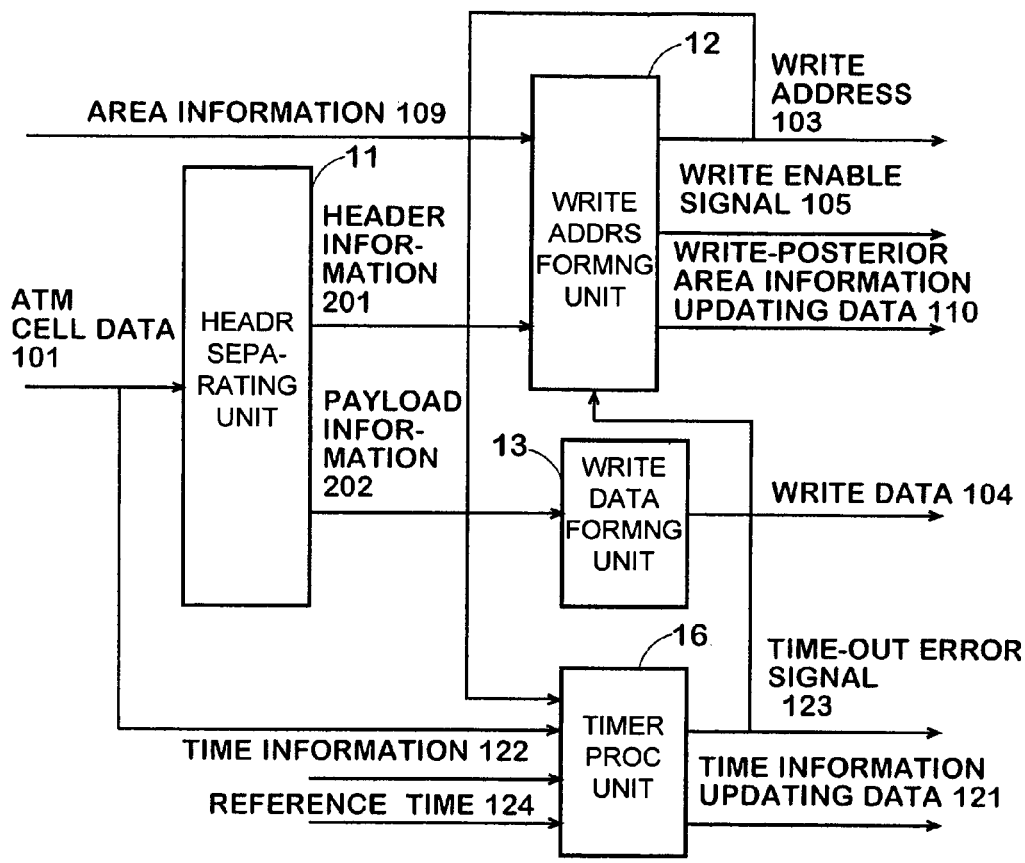
FIG. 21 is an internal constructional diagram of a memory write control unit in the embodiment 4.

FIG. 21 is an internal constructional diagram of the memory write control unit 1c.

The memory write control unit 1c differs from the memory write control unit 1 in the embodiment 1 with respect to a point that a timer processing unit 16 is added. The write address 103, ATM cell data 101, time information 122, and reference time 124 are inputted to the timer processing unit 16. The time information updating data 121 and time-out error signal 123 are outputted from the memory write control unit 1c. The time-out error signal 123 is notified as a warning to the outside and also inputted to the write address forming unit 12. That is, each time the cells of the same connection are inputted, the memory write control unit 1c in the embodiment 4 measures an arrival interval in a range from the timing when the cell which is preceding to the input cell is inputted with respect to the connection to the timing when the subsequent input cell arrives. If the arrival interval exceeds a predetermined value, the frame of the connection to which the cell belongs is abandoned.

Figure 22:
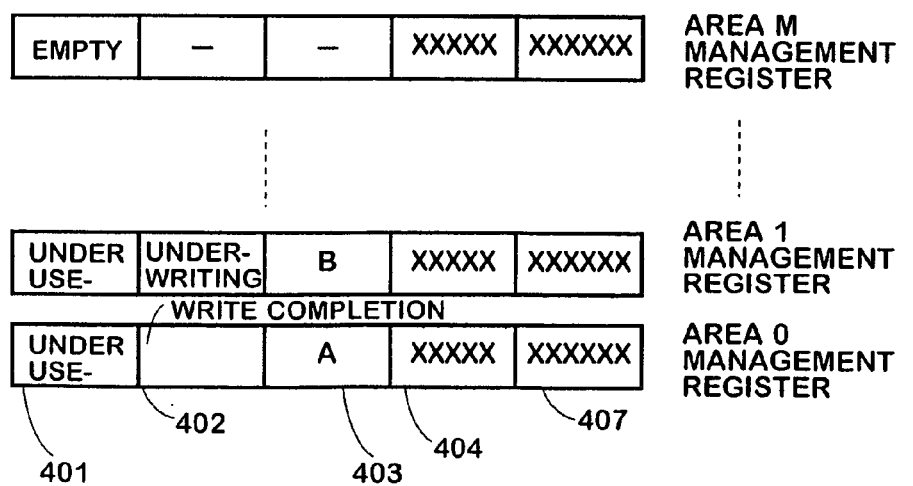
FIG. 22 is an internal constructional diagram of an area management register group in the embodiment 4.

FIG. 22 is an internal constructional diagram of the area management register group 4c.

The area management register group 4c differs from the area management register group 4 in the embodiment 1 with respect to a point that time information 407 is added. The time information 407 is information showing the arrival time of the cell inputted by one cell before the input cell.

In the diagrams, since each of the other constructions is similar to that in the embodiment 1, the same and corresponding component elements are designated by the same reference numerals and their descriptions are omitted here.

<Operation>

The operation of the embodiment 4 will be described mainly with respect to points different from those in the embodiment 1.

For example, in the AAL5 protocol process (refer to ITU-T I 363.5), a function such that the arrival interval of the ATM cells constructing the frame (belonging to the same connection number) is measured, if it exceeds the specific value, it is regarded that time-out has occurred, and this frame is abandoned is defined as an option.

The timer processing unit 16 (refer to FIG. 21) of the memory write control unit 1c recognizes the arrival of the ATM cell by the ATM cell data 101 and detects the time by the reference time 124. Subsequently, by obtaining a difference between the detected time and the arrival time (time information 122) of the previous cell stored in the area management register corresponding to the write address 103, a time interval between the previous cell and the subsequent present cell is calculated and whether it is equal to a value within a specified range or not is discriminated. Thus, if the calculated time interval lies within the specified range, contents in the area management register are updated to the arrival time of the present cell by the time information updating data 121. If the calculated time interval exceeds the specified range, it is regarded that the time-out has occurred, and the time-out error signal 123 is outputted. At the same time, the relevant frame is abandoned by the write-posterior area information updating data 110 of the write address forming unit 12. Specifically speaking, the frame is abandoned as follows.

Figure 23:
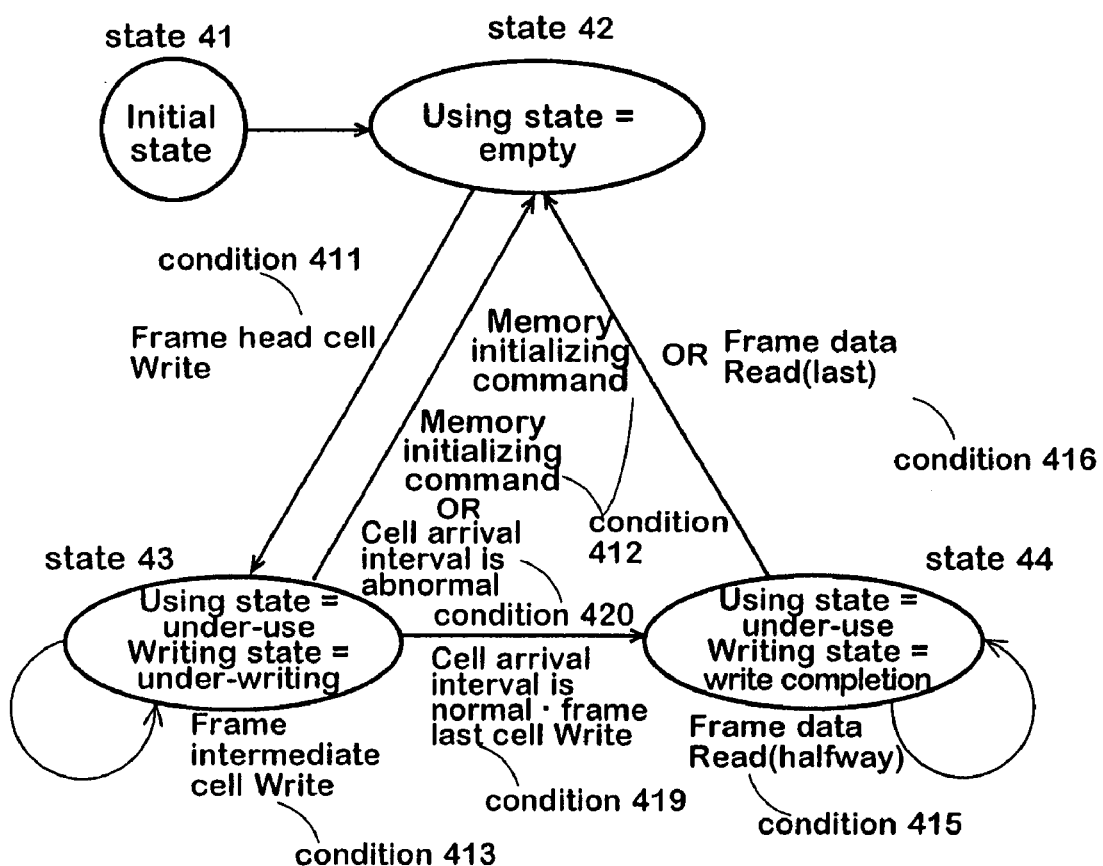
FIG. 23 is a state transition diagram in the area management register group in the embodiment 4.

FIG. 23 is a state transition diagram in the area management register group 4c.

The state transition in the embodiment 4 differs from that in the embodiment 1 with respect to a point that the condition 414 is eliminated and conditions 419 and 420 are added. That is, if the cell arrival interval is normal in the state 43, the state is shifted to the state 44 in a manner similar to the embodiment 1. However, if there is an abnormality in the cell arrival interval, the state is returned to the initial state 42, thereby realizing the abandonment of the frame data.

Although the construction and the operation of the embodiment 4 have been specifically described with respect to the AAL5 protocol process as an example by limiting to the case of measuring the arrival interval between the ATM cells constructing the frame (belonging to the same connection number). However, a case of discriminating whether the total time in a range from the head cell of the frame to the last cell lies within a specified range or not can be also realized by a construction and an operation similar to those mentioned above. In this case, the memory write control unit 1c measures an arrival interval between the first cell and the last cell which belong to the frame of the same connection. If the arrival interval exceeds a predetermined value, this frame is abandoned. That is, the memory write control unit 1c does not output the time information updating data 121 to the area management register group 4c. The relevant area management register holds the arrival time of the first cell. At a point when the last cell arrives, the memory write control unit 1c obtains a difference between the arrival times of the first cell and the last cell and discriminates whether it exceeds the predetermined value or not.

<Effects>

As described above, according to the embodiment 4, the following effects are obtained in addition to the effects of the embodiment 1.

① Like an AAL5 protocol mentioned in the embodiment 4, the processes such that the arrival interval between the ATM cells constructing the frame (belonging to the same connection number) is measured or the total time in a range from the arrival of the head cell of the frame to the arrival of the last cell is measured. When the measured arrival interval or total time exceeds the specified value, a process send out a time-out error can be realized.

② When the time-out error occurs, by returning the area management register to the initial state, the abandonment of the frame data can be easily realized.

<<Modification>>

Although the embodiments have been described with respect to the AAL5 protocol process (refer to ITU-T I 363.5) as an example, the invention is not limited to such a process. For example, the invention can be also applied to other cells such as a cell of a variable length other than the cell of the fixed length such as an ATM cell so long as it constructs a frame by collecting a plurality of cells.

The embodiments 2, 3, and 4 can be also combined.

The present invention is not limited to the foregoing embodiments but many modifications and variations are possible within the spirit and scope of the appended claims of the invention.

What is claimed is:

1. A communication control apparatus for collecting cells belonging to a same connection among a plurality of cells which are inputted, assembling a frame every connection, and outputting each of said frames as frame data, comprising:

a frame assembly memory having a plurality of areas which were set so as to correspond to a maximum one of a plurality of frame lengths which are handled;

a memory write control unit constructed in a manner such that when a cell of a new connection is inputted, said new connection is allocated to an empty area in said frame assembly memory to which the connection is not allocated yet and said cell is written therein, and on the other hand, when the cell of the same connection as the connection which has already been allocated to any of said areas is inputted, said cell is written into said area to which said connection has already been allocated, and if the cells of one frame have already been written in said area, said connection is allocated to another new area, and said input cell is written therein; and a memory read control unit which reads out said collected cells of one frame from said frame assembly memory and outputs them as completed-frame data.

2. An apparatus according to claim 1, wherein each time the cell of the same connection is inputted, said memory write control unit executes an arithmetic operation for discriminating validity of data including said cell stored in said area in which said cell is written.

3. An apparatus according to claim 1, wherein when there is an error of validity of the data of one frame stored in said area, said memory write control unit abandons said frame.

4. An apparatus according to claim 3, wherein when the cells of one frame are written into said area, said memory write control unit abandons said frame.

5. An apparatus according to claim 2, wherein the arithmetic operation for discriminating the validity of said data is a CRC logical arithmetic operation regarding a payload of each cell.

6. An apparatus according to claim 2, wherein the arithmetic operation for discriminating the validity of said data is a parity check logical arithmetic operation regarding a payload of each cell.

7. An apparatus according to claim 2, wherein the arithmetic operation is an OR arithmetic operation of a Loss Priority bit regarding a header of each cell.

8. An apparatus according to claim 2, wherein the arithmetic operation is an AND arithmetic operation of a Loss Priority bit regarding a header of each cell.

9. An apparatus according to claim 1, wherein each time the cell of the same connection is inputted, said memory write control unit executes a logical arithmetic operation of data up to said cell in one frame of said connection, outputs a result of said logical arithmetic operation until the last cell at a point of time when the cells of one frame have been written, and discriminates validity of said frame on the basis of the result of said logical arithmetic operation of each cell constructing said frame on the basis of said output result.

10. An apparatus according to claim 1, wherein each time the cell of the same connection is inputted, said memory write control unit measures an arrival interval in a range from an input of the cell that was inputted at timing of one cell before said input cell to an arrival of the subsequent input cell with respect to said connection, and abandons said frame in said area regarding said connection of said cell if said arrival interval exceeds a predetermined value.

11. An apparatus according to claim 2, wherein each time the cell of the same connection is inputted, said memory write control unit measures an arrival interval in a range from an input of the cell that was inputted at timing of one cell before said input cell to an arrival of the subsequent input cell with respect to said connection, and abandons said frame in said area regarding said connection of said cell if said arrival interval exceeds a predetermined value.

12. An apparatus according to claim 1, wherein said memory write control unit measures an arrival interval in a range from an input of the first cell belonging to the frame of the same connection to an input of the last cell belonging to said frame, and abandons said frame when said arrival interval exceeds a predetermined value.

13. An apparatus according to claim 2, wherein said memory write control unit measures an arrival interval in a range from an input of the first cell belonging to the frame of the same connection to an input of the last cell belonging to said frame, and abandons said frame when said arrival interval exceeds a predetermined value.

* * * * *